United States Patent Office 2,957,304
Patented Oct. 25, 1960

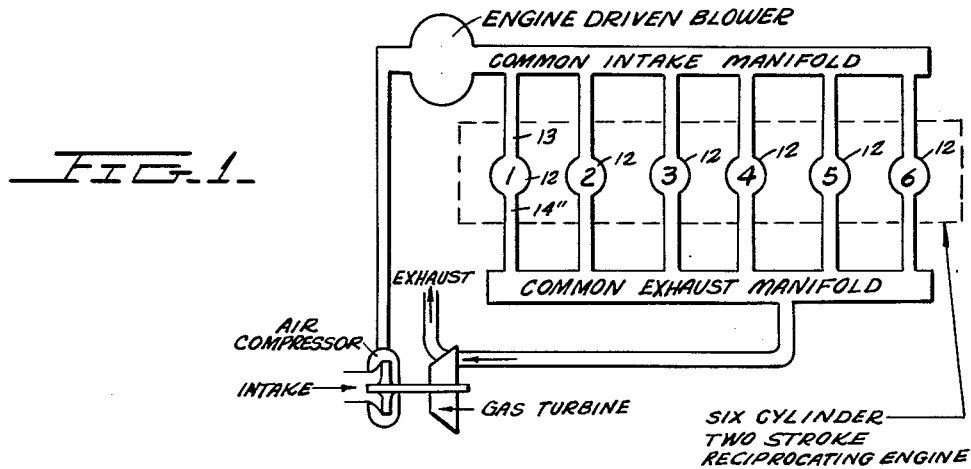
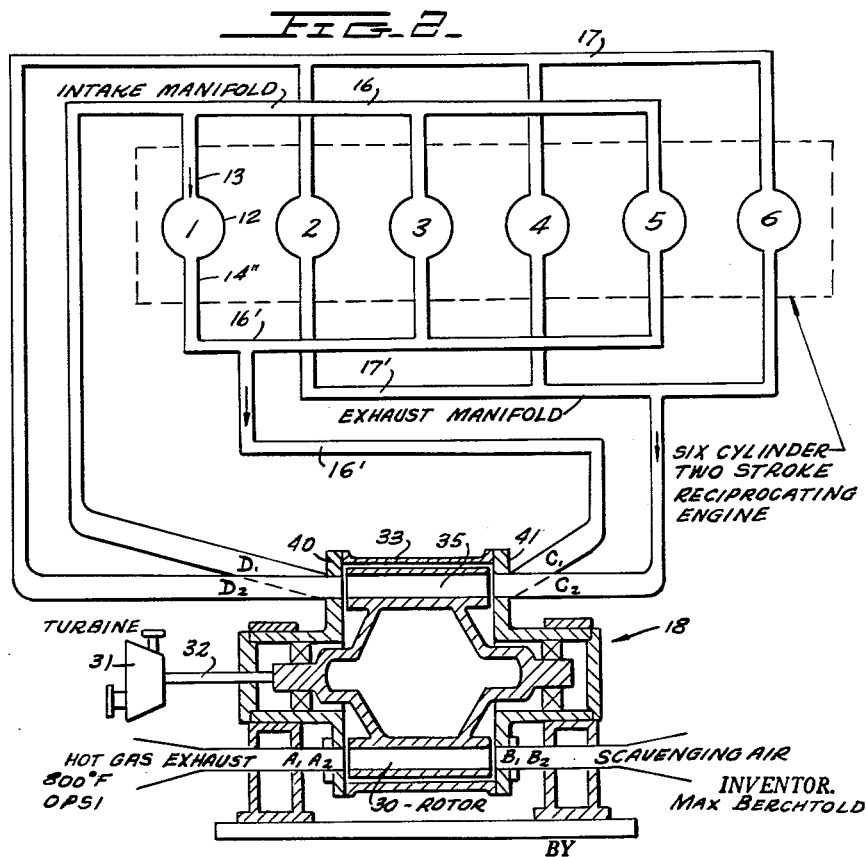

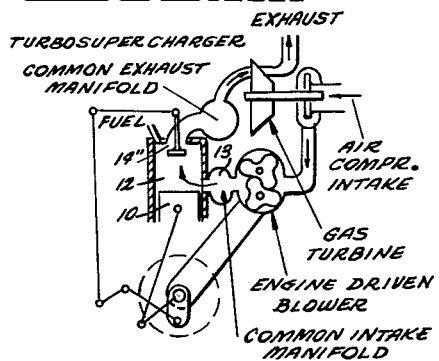
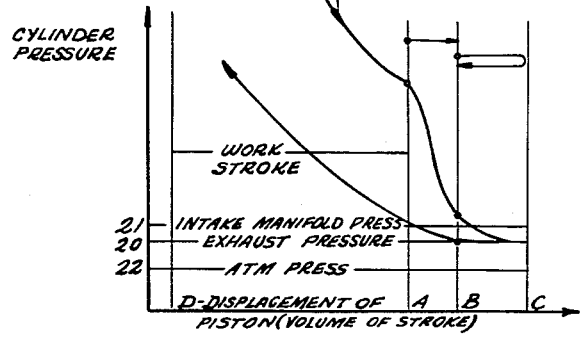
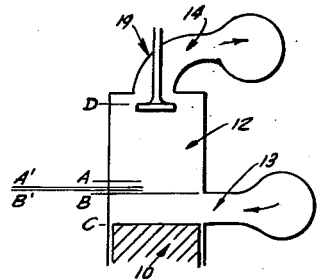
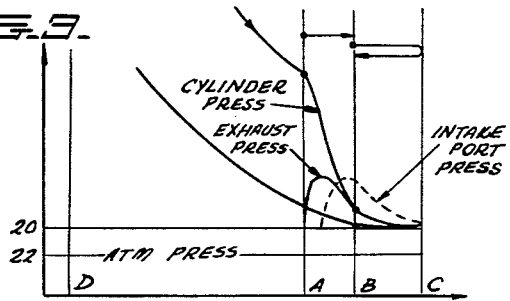
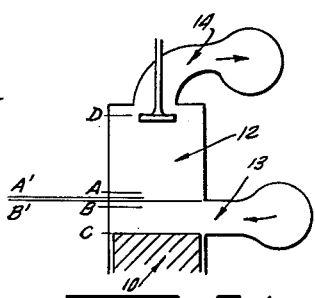
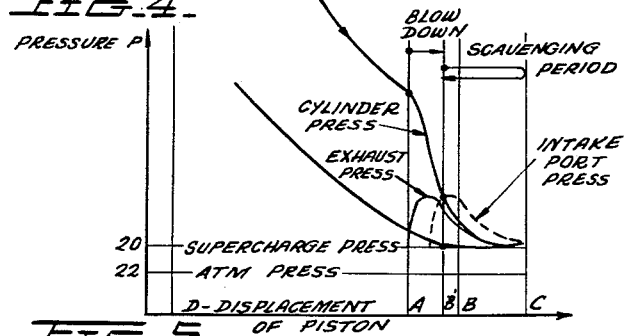
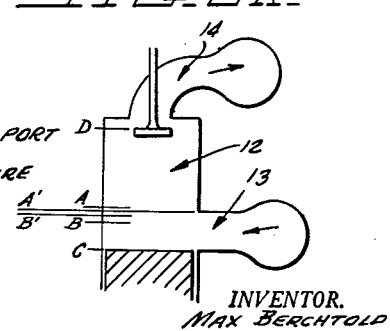
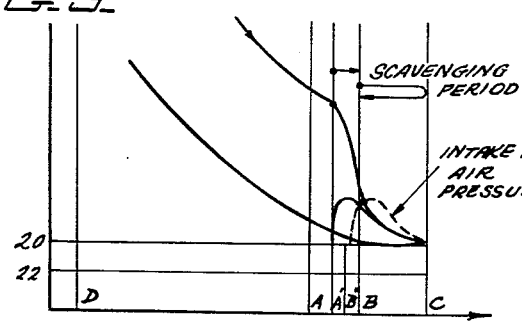

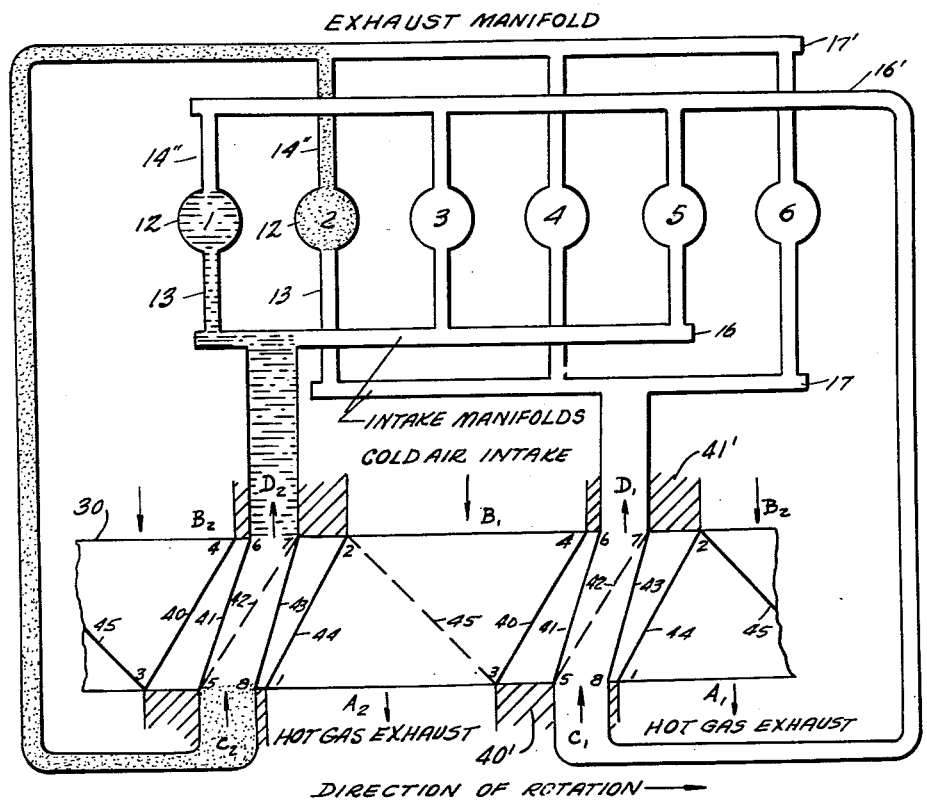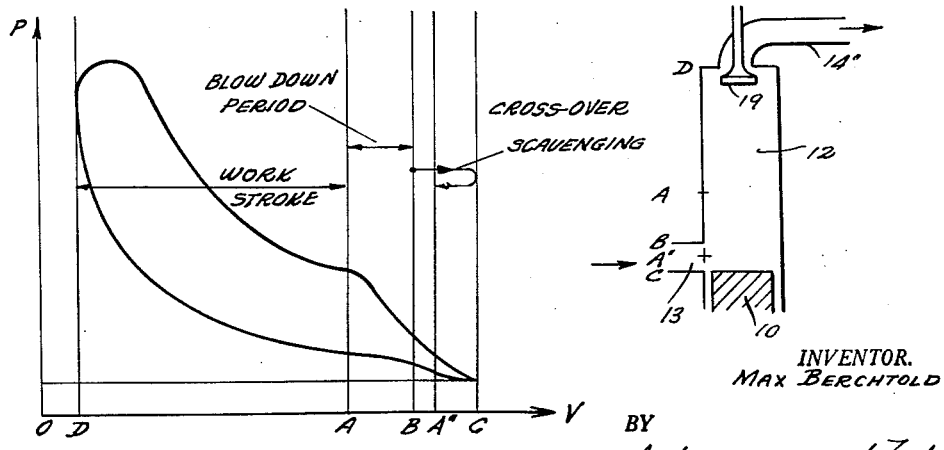

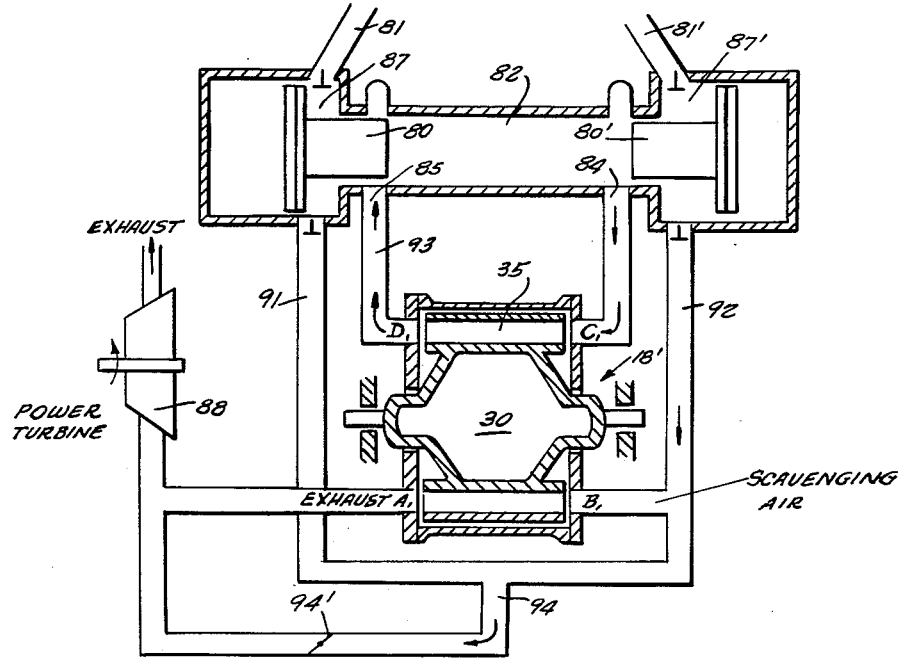
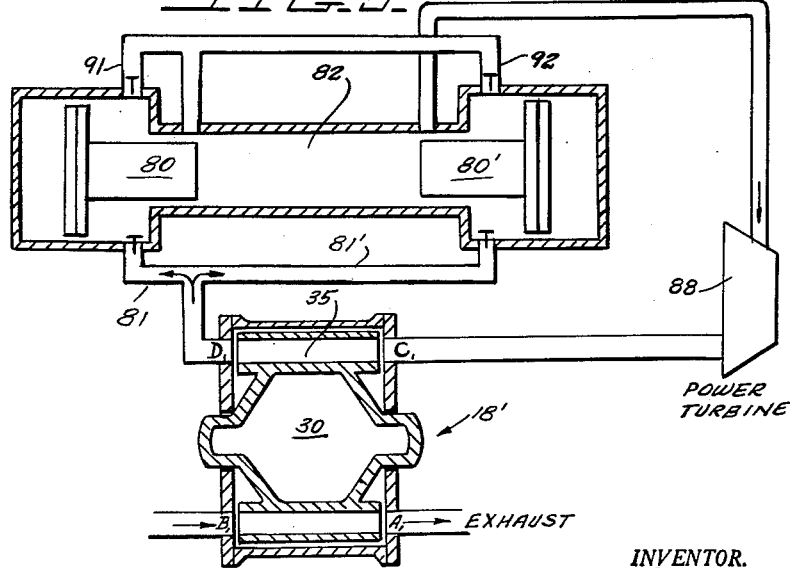

2,957,304

AERODYNAMIC WAVE MACHINE USED AS A SUPERCHARGER FOR RECIPROCATING ENGINES

Max Berchtold, Paoli, Pa., assignor to I-T-E Circuit Breaker Company, Philadelphia, Pa., a corporation of Pennsylvania Filed Sept. 28, 1954, Ser. No. 458,771

14 Claims. (Cl. 60—13)

My invention relates to the utilization of an aero dynamic wave machine as an exhaust gas driven supercharger for reciprocating type engines and particularly for diesel gas and gasoline engines of the two stroke type, and is more particularly directed to a novel arrangement to utilize the blow down energy of the exhaust gas to obtain high pressure air for scavenging and supercharging.

In the prior art supercharging by means of an exhaust gas driven air compressor has been widely used with four stroke engines, where the efficiency requirements for the supercharger are not as rigid as with two stroke engines. The four stroke engine, which is larger and heavier than the two stroke engine, was forced into supercharging to keep up with the competition of the two stroke engine. Turbo-supercharging has recently been introduced with two stroke diesel engines in the 10,000 H.P. class. These large engines require a large flow capacity turbo-supercharger which can be built with the required efficiency. Furthermore, these large engines which operate at low speed require a minimum scavenging pressure. It is therefore possible to get by with the available turbo-supercharger efficiencies.

However, small high speed two stroke reciprocating engines require high scavenging pressures at relatively small mass flow. Particularly at low load, where the exhaust pressure is small there is not enough air pressure available for sufficient scavenging an aero-dynamic wave machine with direct transmission of energy from one gas to another is particularly suitable because it permits to transform the kinetic energy usually lost in the exhaust into useful air pressure for scavenging.

The four stroke reciprocating engine does not require scavenging, since the piston drives out the exhaust gas, the intake manifold and pressure can be lower than the exhaust pressure. Furthermore, the exhaust gases of a four stroke engine are at a higher temperature since they are not diluted by the scavenging air. Hence, because less pressure is needed and more energy higher temperature is available, a turbo-supercharger with lower efficiency can be used. Several methods have been proposed to supercharge the two stroke engine which would make this engine the lightest and most efficient piston engine.

Prior art methods to operate small fast two stroke diesel engines with turbo-supercharger require an engine driven blower to produce the required pressure for the scavenging at low engine load. This requirement of an added component is undesirable and costly.

An aero dynamic wave machine, which is used as a super-charger in my instant invention, is shown and described in my co-pending application Serial No. 454,774, filed September 8, 1954, to Max Berchtold entitled "Wave Engine" and assigned to the assignee of the instant invention. Since the aerodynamic wave machine permits a high recovery of the exhaust energy, it can be used for supercharging all types of two stroke and four stroke reciprocating engines.

Furthermore, this type supercharger can be used for four stroke gasoline and gas engines which have generally higher exhaust temperatures, whereas turbo-superchargers need special provisions for turbine cooling. The rotor of the aero-dynamic wave machine which is alternately exposed to cold air and hot gas never reaches the hot gas temperature and hence, no cooling provisions are required.

Various attempts have been made to improve the turbo-supercharger so it can be used with two stroke engines by recuperation of the kinetic energy of the exhaust gases. This usually called "blow down energy" is unused at the completion of the work stroke of the piston. At the opening of the exhaust port of the cylinder, the gases have a high exhaust kinetic energy. This blow down energy which amounts to a considerable portion of the shaft energy is dissipated and lost when a common exhaust manifold for all the cylinders is used. An improvement is obtained by using individual exhaust ducts directly from the cylinder to the turbine; this permits a partial recuperation of the blow down energy. With more turbine power available, more air pressure can be produced. This is an attempt to eliminate the engine driven blower.

The aero-dynamic wave machine offers the possibility of separate exhaust and separate intake manifolds. This permits utilization of pressure fluctuations not only in the exhaust, as in the prior art, but also in the intake manifold. This is a distinct disadvantage of the prior art since successful operation requires that the pressure in the exhaust manifold be lower than the pressure in the intake manifold during at least part of the scavenging period.

With my novel arrangement, the pressure in the intake manifold also fluctuates so that the air pressure therein is considerably higher than the exhaust gas pressure during the entire scavenging period. This desirable result is accomplished in my novel arrangement since the aero-dynamic wave machine operates by a direct exchange of energy from the exhaust gas to the intake air. As soon as a blow down energy arrives at the aero-dynamic wave machine, its energy is transmitted directly to the air and hence, compressed air is available to the input manifold at the instant it is required.

Accordingly, an object of my invention is to provide an aero-dynamic wave machine as a supercharger for a reciprocating engine and more particularly for small fast two stroke engines.

Still another object of my invention is to provide a novel supercharger arrangement wherein the blow down energy is immediately transmitted to obtain high pressure air in the input manifold at the instant it is required for scavenging at low load operation.

Another object is to provide an aero-dynamic wave machine as a supercharger wherein the scavenging period can be increased due to immediate direct transformation of blow down energy to obtain high pressure air in the intake. Furthermore, for a given length of scavenging period a longer work stroke can be obtained since scavenging starts shortly after the opening of the exhaust port.

Still another object of my invention is to provide a gasoline reciprocating engine or another type of reciprocating engine having a hot exhaust with a supercharger which requires no auxiliary cooling equipment since the hot and cold gases are exposed to a common rotor so that the rotor will never reach the full temperature of the gas.

Another object of my invention is to provide an aero-dynamic wave machine supercharger for reciprocating engines having the exhaust ports of the cylinders controlled by either a piston or a valve.

A still further object of my invention is the utilization of an aero-dynamic wave machine as a supercharger for cross scavenging cylinders of a reciprocating engine.

Another object of my invention is to provide a two or more cycle per revolution aero-dynamic wave machine for a multi-cylinder reciprocating engine having two or more intake and two or more exhaust manifolds.

Another object of my invention is to provide a single cycle per revolution aero-dynamic wave machine for each free piston compressor unit.

These and other objects of my invention will be apparent from the following description when taken in connection with the drawings, in which:

Figure 1 is a schematic arrangement showing a prior art arrangement of a diesel engine with a common input and exhaust manifold for a six cylinder two stroke reciprocating engine having a turbo-supercharger as illustrated in Figure 1A.

Figure 1A shows in more detail the combination of a turbo-supercharged two stroke reciprocating cylinder with an engine driven scavenging blower in which the blow down energy is dissipated to a common exhaust manifold.

Figure 1B is an indicator chart of the cylinder shown in Figure 1A. The cylinder pressure is plotted over the displacement (volume) of the piston. The exhaust and intake manifold pressures are also shown in the same chart.

Figure 2 is a schematic arrangement showing a six cylinder two stroke reciprocating engine with an aero dynamic wave machine supercharger with two intake and two exhaust manifolds.

Figure 3 is an indicator chart of one of the six cylinders in Figure 2 and also shows the pressure in the exhaust and intake port.

Figure 3A is a cross section of a cylinder and piston illustrating the air intake port and the exhaust port. The indicator chart therefore is illustrated in Figure 3.

Figures 4 and 4A refer to an arrangement as seen in Figure 2.

Figures 5 and 5A refer also to an arrangement as seen in Figure 2. This figure differs from Figure 3 in that the exhaust port is moved down to be in closer alignment with the air intake port.

Figures 6 and 6A refer to an arrangement of a two stroke reciprocating engine connected as seen in Figure 7 with a two cycle per revolution aero dynamic wave machine supercharger.

Figure 7 is a schematic arrangement showing a cross over input and exhaust manifold for a six cylinder two stroke reciprocating engine with a two cycle per revolution aero dynamic wave machine supercharger.

Figure 8 is an illustration of a free piston compressor unit wherein a single cycle per revolution aero-dynamic wave machine is used as a supercharger for each unit.

Figure 9 is a schematic representation of a free piston compressor and aero-dynamic wave machine illustrating a modification of Figure 8.

In Figures 1 and 1A, I have shown a two stroke reciprocating engine with a prior art turbo-supercharger arrangement. The cylinder 12 exhausts through the exhaust port 14″ to the common exhaust manifold which is used for all the cylinders (1, 2, 3, 4, 5, 6) and then to the gas turbine which serves as a prime mover for the air compressor. The output of the air compressor is supplied to the engine driven blower to feed compressed air to the cylinders 12 through the common intake manifold and input ports 13.

The Figure 1B represents an indicator diagram of the cylinder pressure versus the displacement of the piston (volume) for a cylinder shown schematically in Figure 1A of the two stroke diesel engine supercharged by turbo-supercharger as shown in Figure 1. This diagram only shows the low pressure portion of the cycle. The upper portion of the loop is omitted.

A description of the pressure within the cylinder and the ports or manifolds when a turbo-supercharger is used will now be given. In Figure 1A, I have shown a cross-sectional view of a typical cylinder 12 of a diesel engine having longitudinal scavenging. The cylinder 12 has an intake port 13 and an exhaust port 14″. The position of the piston 10, as it initially opens the exhaust port 14″ on its downward stroke, is indicated by A in both Figure 1A and in the indicator chart of Figure 1B.

When the piston 10 is in position A, the pressure in the cylinder 12 is rapidly decreasing as the piston 10 moves further. The pressure in the exhaust port 14 is illustrated by the horizontal line marked 20. This is the pressure ahead of the supercharger turbine. In order to eliminate pressure fluctuations in the exhaust which would hinder an efficient scavenging of the cylinders in scavenging phase, it is necessary to provide a large exhaust manifold as seen in Figure 1A. The constant exhaust pressure ahead of the turbine is shown by line 20 in Figure 1B.

As the piston 10 continues to move downwardly to the position indicated at B, it will start to open the intake port 13, and, as seen in the indicator chart of Figure 1B, the pressure within the cylinder 12 has dropped to a pressure approximately equal to the air intake pressure in the manifold 13. The pressure in the intake port is given by the line 21. Compressed air delivered by the turbo-supercharger and the engine driven blower will now be supplied to the cylinder 12. The air intake pressure at the input port 13 is indicated in Figure 1B by the horizontal line marked 21.

During the interval of time that the piston 10 is moving from the position A to the position B, the blow down energy is being exhausted through the exhaust port 14 and is referred to as the blow down period as noted on the indicator chart of Figure 1B. Immediately following the period B, while the piston 10 is still moving downwardly, the intake air pressurized by the supercharger and engine driven blower is being supplied to the cylinder 12 through port 13 in order to scavenge out the remaining combustion gases within the cylinder 12. This scavenging takes place during the time the piston 10 moves from the position B to its lowermost position C as well as during the movement of the piston 10 in the upward direction until the piston moves back to its position B.

If the exhaust valve 14 closes at the same time as the piston 10 closes the intake port 13, the pressure within the cylinder 12 will not reach the manifold pressure 21. If the exhaust valve is closed earlier, the pressure in the cylinder will reach a pressure equal to the manifold pressure 21. The atmospheric pressure is indicated by the line 22.

Somewhat before the piston 10 reaches its uppermost position D, the fuel is injected and mixed with the compressed air. Ignition is initiated as a result of high compression temperatures to thereby drive the piston 10 downwardly. Hence, the pressure within the cylinder 12 will again commence to decrease as indicated on the indicator chart. That is, as the piston 10 is driven downwardly from position D to the position A, about two thirds of the work stroke is being completed. The conditions as the piston 10 moves downwardly from the position A has been described above and hence, the cycle is repeated.

The arrangement is illustrated in Figure 2 wherein an aero dynamic wave machine 18 is used as a supercharger for a six cylinder two stroke engine and the blow down energy of cylinder 1 is used to obtain high pressure air to scavenger cylinder 1, etc.

In this arrangement the six cylinders 12 are designated by 1, 2, 3, 4, 5, 6 and there is a common air intake manifold 16 for cylinders 1, 3, and 5, a common exhaust manifold 16′ for cylinders 1, 3, and 5, a common intake manifold 17 for cylinders 2, 4, and 6, a common exhaust manifold 17′ for the cylinders 2, 4, and 6.

The aero dynamic wave machine 18 is comprised of a rotor 30 which is rotated for proper timing of the ports by means of a prime mover 31 through shaft 32. Stator plates 40 and 41 contain ports which permit pick-up and output of gas from the channels or cells 35 of the rotor 30. The stator plate 41 contains the input nozzle $C_1$, $C_2$ connected to exhaust manifold 16' and 17', respectively, and the scavenging ports $B_1$ and $B_2$.

It will be noted that scavenging for the machine 18 can be achieved by means of a blower, or the device can have automatic scavenging as set forth in my abovementioned copending application Serial Number 454,774, filed September 8, 1954, by utilizing the reversed cycle, or Serial Number 463,953, filed October 22, 1954, by using helical blade rotor.

The stator plate 40 contains the output ports $D_1$, $D_2$ connected to intake manifolds 16 and 17, respectively, and the exhaust ports $A_1$ and $A_2$.

In the illustration of Figure 2 the aero dynamic wave machine 18 is a two cycle per revolution device. However, in case a single cycle per revolution unit is used there would be instead of the ports $A_1$ and $A_2$, $B_1$ and $B_2$, $C_1$ and $C_2$, and $D_1$ and $D_2$, respectively, only one port A, B, C and D. The operation and theory of the single and double cycle per revolution aero dynamic wave machine is set forth in aforementioned copending application Serial Number 454,774, filed September 8, 1954.

The operation of the arrangement shown in Figure 2, wherein an aero dynamic wave machine 18 is utilized as a supercharger will now be described in connection with the indicator chart of Figure 3, in which the condition within any one cylinder such as that shown in Figure 3A is illustrated. This diagram shows the variation of the pressures in the manifolds. When the piston 10 is in the position A the pressure in the exhaust port 14 is at its lowest point.

However, as the piston 10 moves downwardly past position A and thereby commences to open the exhaust port 14 the blow down energy will immediately increase the pressure in the exhaust port 14 due to the compression wave in the exhaust pipe. However, as the piston 10 continues to move downwardly the pressure in the cylinder 12 will continue to decrease. The exhaust pressure 14 will always be below the cylinder pressure and will finally reach the initial pressure, which is indicated by the number 20 on the left of the indicator chart of Figure 3.

It will be noted that the pressure in the intake port 13 is initially equal to the pressure in the exhaust port. The blow down energy transmitted through the aero dynamic wave machine makes the air pressure go above the exhaust gas pressure at the position B.

The reason for this is the time lag between the beginning of the blow down period and the arrival of the high pressure at the intake port. This is the reason why scavenging can be assured even at low load, which means a low level of supercharging.

The prior art arrangement does not produce a sufficiently high pressure of the air for scavenging at low load, therefore, the engine driven blower is required. At higher loads the problem is less critical because there is excess energy available. However, in the case of the aero dynamic wave engine supercharger it is possible to change the ports in order to obtain more power at the shaft.

Such a re-arrangement of the ports within the cylinder 12 is illustrated in Figure 4A. In this case the same arrangement of the manifolds and supercharger is used as shown in Figure 2.

A multi-manifold such as described in Figure 2 cannot be utilized in conjunction with a standard turbo supercharger shown in Figure 1A, since the exhaust pressure fluctuation would not be transmitted to the intake air on account of the rotational inertia of the turbo supercharger.

Figure 4, is the indicator diagram for a cylinder shown in Figure 4A. In the cross sectional view of the cylinder 12 of Figure 4A the input port has been moved up within the cylinder 12 so that its opening is closer to alignment with the opening of the exhaust port 14. The input port is therefore now designated at 13' to replace 13 and the opening of the input port 13' is now designated as B' instead of B. The remaining numerals and letters are as heretofore noted for Figure 3A.

Due to the fact that the aero dynamic wave machine 10 has a direct transfer of blow down energy of the gas to the intake air, it is possible to obtain scavenging air at a pressure higher than the exhaust pressure at an earlier instant. This is the reason why the opening of the port 13' can be moved from B to B'.

In the prior art arrangement, the exhaust gas energy is not instantly available, since the blow down energy has to be converted into shaft power by the turbine and then into pressure again by the compressor. Pressure fluctuations are leveled out by the inertia of the rotor.

After the piston 10 moves downwardly past position B' to open port 13' and the exhaust port 14 stays open until the piston 10 moves up again to the position of B', it is advantageous to close the exhaust valve at the source.

Thus, the pressure within the cylinder 12 will be close to the lowest intake manifold pressure. The longer scavenging period assures good combustion and cooled exhaust valves.

It will be noted that by utilizing an aero dynamic wave machine as a supercharger we are not only able to obtain a longer scavenging period, but also by readjusting the timing of the exhaust ports 14 and the intake port B with respect to the cylinder 12, it is possible to increase the work stroke.

That is, since higher pressures are available for the scavenging, the scavenging period can be reduced and therefore a better efficiency of the power plant can be obtained. A further gain in efficiency is possible since the engine driven blower is no longer required.

This arrangement is shown in Figures 5 and 5A. In Figure 5A, I have shown a modification of the relationship of the intake and outport resulting in a shorter scavenging period.

However, with this arrangement, utilizing an aero dynamic wave machine, connected as illustrated in Figure 2, the work stroke of the piston 10 is increased. In the arrangement, the intake port 13 has about the same position with respect to the cylinder 12 as noted in the cross-sectional view of Figure 3A. However, the exhaust port now opens later decreasing the time interval between opening of the exhaust port 14 and the intake port 13. The changed timing of the exhaust valve 14' can readily be seen in the indicator chart Figure 5 by comparison of the position A with the position A'. Thus at the time when the piston 10 is in the position A' the blow down energy is available for the aero dynamic machine 18.

Although there is a direct transmission of energy within the areo dynamic wave machine there is the delay from the period A' to the time when the piston 10 is moved in the position B. The pressure in the intake port 13 will start to build up as indicated by the dotted line of the indicator chart of Figure 5. Hence, when the piston 10 reaches the position B, that is the opening of the input port 13, high pressure air is available for scavenging. It will be noted that scavenging will exist from the period when the piston 10 in the position B until it reaches its lowermost position C and continues until the piston moves upwardly to the position B. This scavenging period is the same length as noted in Figure 3 for the cylinder of Figure 3A and shorter than the length noted in Figure 4 for the cylinder of Figure 4A.

On the upward stroke of the piston 10 the exhaust port 14' is closed at the latest at location B. The pressure builds up within the cylinder 12 during this interval of time, to the remaining intake manifold pressure.

With my second embodiment illustrated in Figures 2, 5 and 5A, the work stroke is increased so that it exists from the time when the piston 10 is in the position D until the piston is in the position A'. Thus, the effective increase in the length of the work stroke is from the position A′ to the position A″.

In the illustrated two embodiments of Figure 2, with cylinder as noted in Figure 4A and 5A having indicator charts of Figures 4 and 5 respectively, there are two exhaust ports for the two stroke diesel engine and hence, there will be two input ports 16′, 17′ of available gas to the aero dynamic wave machine 18. Accordingly, a two cycle per revolution areo dynamic wave machine will be used. This device is disclosed in aforementioned copending application Serial Number 454,774, assigned to the assignee of the instant invention.

In the embodiment shown in Figures 4A and 5A there is illustrated a longitudinal scavenging type of cylinder wherein the exhaust port in controlled by an exhaust valve. However, in the type of arrangement where the exhaust port and the air intake port is controlled by the piston or when the intake port in controlled by a valve my arrangement is equally applicable.

Furthermore, it will be noted that in some applications of reciprocating two stroke engines as, for example, when four, six or more cylinders are used, it may be desirable to provide a crossover arrangement for use in connection with the areo-dynamic wave machine. That is, the blow down energy from a first cylinder will be utilized as the means to obtain high pressure scavenging air for a second cylinder. This arrangement of Figure 7 and the indicator chart for the arrangement of Figure 7, having a valve controlled cylinder of Figure 6A, is shown in Figure 6.

In the cross-sectional view of the cylinder shown in Figure 6A, I have shown the exhaust port 14″ controlled by means of a valve 19. It will be noted that although the crossover system of Figure 7 could be applied to reciprocating type engines having various scavenging systems, it is particularly adaptable to cylinders having a valve controlled exhaust port, as shown in Figure 6A.

It will be noted that in the valve controlled exhaust port arrangement of Figure 6A, the exhaust port 14″ is opened during the downward stroke of the piston 10 (as it passes position A) before the intake port 13 is opened, and closed before the input port 13 is closed (as piston 10 moves up past position A″) so that high pressure air can be introduced and trapped within the cylinder 12 by means of the aero-dynamic wave machine supercharger 18. That is, the exhaust port 14″ will be opened by the valve 19 when the piston 10 moves past position A during the downward work stroke and closed as the piston 10 moves upwardly past A″ during the compression stroke.

When the exhaust port 14 is initially opened, the pressure within the cylinder 12 will commence to drop, as seen at A in Figure 6. After the piston 10 reaches the position B, the intake port 13 will be opened and scavenging will start.

The scavenging will continue from the period of the time that the piston 10 passes from the position B until its lowermost position C and also until the piston is moved upwardly to the position A″.

However, when the piston 10 is moved upwardly to the position A″, the exhaust port 14″ will be closed by valve 19. Hence, the high pressure air of the input port 13, which is available at this time, will be introduced into the cylinder 12 and captured therein so that there will be a supercharging action during the interval of time that the piston 10 is moving from the position A″ to the position B, at which time the input port 13 will be closed by the piston 10. This operation is clearly seen on the indicator chart of Figure 6.

There will be a rise in the pressure of the air within the cylinder 12 during the interval of time from A″ to B. Thus, as above noted, in order to achieve proper supercharging for cylinder 12, a high pressure air must be available in the input port 13 at the time A″ until the time B.

This type of scavenging is more efficient since the pressure in the cylinder might fall too close to atmospheric pressure. The lower pressure means that less gas is remaining in the cylinder. With an equally efficient volumetric scavenging and then filling up the cylinder with compressed air to desired supercharger pressure gives a lower percentage of combustion gas.

The compressed air required is produced by means of the crossover arrangement schematically illustrated in Figure 7. The reason that a high pressure gas is available at the cylinder 12 at the time A″ is that the blow down energy from a second cylinder is utilized. Thus, for example, as seen in Figure 7, the input manifold 16 for the cylinders 1, 3, and 5 derives its energy from one of the cylinders 2, 4, and 6 through exhaust manifold 17′ and the aero-dynamic wave machine 18.

At a two-stroke piston engine, the scavenging period lasts approximately one-third of a revolution. Combining three cylinders into one manifold gives, therefore, no interference between the three cylinders of the same group. A six cylinder engine with a phase angle of 60° between cylinders and two independent manifold systems 16 and 17 is therefore best suited for this configuration.

Thus, for example, when the piston of cylinder 1 is moving downward past position B, the piston of cylinder 2 will be moving downward past position A so that the blow down energy of cylinder 2 will pass through exhaust manifold 17′, through aero-dynamic wave machine 18, and be available as high pressure air in intake manifold 16 for cylinder 1 as soon as the input port 13 thereof is opened by the piston 10.

The arrangement of the manifolds 16 and 17, 16′ and 17′ to a two-cycle aero-dynamic wave machine with reversed cycle is shown in Figure 7. The schematic wave diagram shows the fresh air intake ports $B_1$ and $B_2$, the compressed air pickup $D_1$ and $D_2$. The hot gas intake to the supercharger is at $C_1$ and $C_2$ and the hot gas exhaust at $A_1$ and $A_2$. In contradiction to the forward cycle, described in aforementioned copending application Serial Number 454,774, the intake and pick-up ports are on the same side of the rotor while the hot gas intake and the hot gas exhaust ports are on the other side of the rotor.

The description of the reversed cycle is arbitrarily started during the scavenging period. Fresh air is replacing the hot gas in the rotor. At the time the fresh air reaches the exhaust port, the channel passes point 3 where it is closed. A compression wave 40 is created which travels upstream. It reaches the intake at the time the intake port closes at point 4. In the meantime, the channel has passed the opening corner 5 and hot gas enters the channel producing a second compression wave 41 which arrives at the opening edge 6 of the pick-up. The interface 42 arrives when the channel is closed at the edge 7.

Since the hot gas at high pressure entering the rotor 30 through the high pressure inlet ports $C_1$ and $C_2$ and the cool gas in the rotor 30 necessarily mix at the interface 42, it will be required to provide an adjustment for closing of the high pressure outlet means or pick-up ports $D_1$, $D_2$ to take into account the zone of intermix gas at the interface 42. Thus, it is often advantageous to close the pick-up ports $D_1$, $D_2$ by means of the trailing edge 7 so as to insure that no particles of the hot gas entering through high pressure inlet ports $C_1$, $C_2$ which might have mixed with the cold air within the rotor, will enter the high pressure outlet port $D_1$ or $D_2$. That is, it may be desirable to have incomplete high pressure scavenging by preventing the entire interface zone from being scavenged into the high pressure outlet ports $D_1$, $D_2$ by closing off the ports $D_1$, $D_2$ through the trailing edge 7 at an earlier time, i.e., prior to the time that the interface zone arrives at the end of the channel. Since the interface 42 in the channel between ports C and D is not a clearly demarked boundary but an area or zone defining a boundary, we can in the operation of our device select different locations for point 7. Thus, for instance, point 7 may be located at the center of the zone which defines the space between the operative gas and the compressed gas or point 7 can be located at the boundary of the zone adjacent the hot gas or it can be located at the boundary of the zone adjacent the compressed gas. We have found that for the best efficiency in operation, the entire range of the interface zone (it should be borne in mind that this is a zone and not a well-determined line) should be regarded as part of the hot gas or operative gas so that point 7 is fixed at a point on the cold or compressed air side of the boundary with the arrangement being such that all of contaminated or mixed gas in the boundary will be blocked off at point 7.

At this time, the expansion wave 43 also arrives. This wave is created by the closing of the hot gas intake at edge 3. The edge 1 then opens the channel at the exhaust creating another expansion wave 14. This wave arrives at the intake port opening edge 2 where fresh air starts to enter the channel. The progression of the interphase between cold air and hot gas is marked 45. This concludes a wave cycle and, in the arrangement shown, refers to half a turn of the rotor. A second cycle, identical in its wave pattern, follows the first. The pressures in the ports $D_1$ and $D_2$, $C_1$ and $C_2$ however are different since they represent different phases of the scavenging period.

The aero-dynamic wave machine shown in Figure 2 indicates a duct arrangement for a forward cycle. The reversed cycle explained above can be used as well. The only difference is the combination of the manifolds and possibly the valve timing and the port locations.

It will be noted that my invention is also applicable to a free piston type compressor, as shown in Figure 8. Thus, an aero-dynamic wave machine operating with the principles, as heretofore described in connection with Figures 2, 3, 3A, 4, 4A, 5, 5A, 6 and 6A, can be readily applied since in this case the second piston controls the exhaust port.

In a free piston compressor which has longitudinal scavenging, each series of pairs of pistons do not coordinate nor are they timed with each other. That is, each pair of pistons operate as an independent unit. With this type of arrangement, it may be desirable to provide an aero-dynamic wave machine 18' for each unit, as seen in Figure 8.

Since there is a single pickup port $D_1$, as a single cycle operation per revolution aero-dynamic wave machine of the type disclosed in aforementioned copending application Serial Number 454,774 can be used.

The free piston compressor may be of the type described in the paper entitled "The Free-Piston and Turbine Compound Engine—Status of the Development," by A. L. London and published by the Society of Automotive Engineers.

The pistons 80 and 80' are mounted within the common cylinder 82, move in opposite directions, and are free pistons which are timed together by an external mechanism (not shown). Air intakes are provided at 81 and 81' for the chambers 87 and 87' of the pistons 80 and 80' wherein the compression will take place.

Following combustion within the chamber 82, the exhaust port 84 is opened first by piston 80' as it is moved to the right thereby permitting the blow down energy to be transmitted through the exhaust port 84 hot gas intake port $C_1$ of the aero-dynamic wave machine 18'.

Immediately following the opening of the cylinder exhaust port 84, the cylinder input port 85 is opened by the movement of piston 80 to the left thereby permitting high pressure scavenging air to be introduced into combustion chamber 82 from the pickup port $D_1$ of the aero-dynamic wave machine 18'.

The air compressed on the left and right, respectively, of piston 80 and 80' serves as a bounce cylinder to drive the free pistons 80 and 80' to the right and left, respectively, to thereby compress the air within compression chambers 87 and 87'. This air is supplied to the port $B_1$ of the aero-dynamic wave machine 18' where it is further compressed. The output air from port $D_1$ is introduced into the active cylinder 82 which supplies the energy to free floating pistons 80, 80'. The exhaust from port $A_1$ serves as the input to the power turbine 88.

A bypass duct 94 may be provided in order to permit direct flow of compressed air to the power turbines when the control valve 94' is open.

The aero-dynamic wave machine 18' is a single cycle per revolution unit as aforementioned and is described in detail in aforementioned copending application Serial No. 454,774.

In the arrangement shown, Figure 9 represents a modification of the embodiment of Figure 8. The free piston engine is essentially the same as Figure 8. In this case, the air entering at 81 and 81' is precompressed by an aero-dynamic wave machine 18'. The air compressed further by the free floating pistons 80 and 80' is supplied to the active cylinder 82 through ducts 91 and 92. The hot gases leaving the cylinder 82 drive the output turbine 88. Then these gases enter the wave machine 18' through port $C_1$, where the gases are expanded to atmospheric pressure within the rotor and are being discharged through the exhaust duct $A_1$. The energy extracted is used to compress the air entering at $B_1$ and discharged at $D_1$.

This arrangement is a reversal of the embodiment shown in Figure 8. The arrangement shown in Figure 9 has the advantage of compactness while the system shown in Figure 8 permits higher efficiency. It is possible to combine embodiment of Figure 8 with embodiment of Figure 9.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. In a free piston type compressor having a first and second piston, a common combustion chamber for said first and second piston, an input and exhaust port for said combustion chamber, said first piston controlling the opening and closing of said exhaust ports, said second piston controlling the opening and closing of said input port, an aero-dynamic wave machine having a hot gas intake port and a pick-up port, said hot gas intake port being connected to said exhaust port, said pick-up port being connected to said input port, said aero-dynamic wave machine converting the blow down energy of said combustion chamber to compressed air.

2. In a free piston type compressor having a first and second piston, a common combustion chamber for said first and second piston, an input and exhaust port for said combustion chamber, said first piston controlling the opening and closing of said exhaust ports, said second piston controlling the opening and closing of said input port; an aerodynamic wave machine and a turbine, said aerodynamic wave machine having a pick-up port and a hot gas intake port, said hot gas intake port being connected to the exhaust of said turbine, said exhaust port being connected to said input port, said pick-up port being connected to said turbine.

3. The combination of a pressure exchanger and an interal combustion engine to be supercharged by said pressure exchanger, in which combination said internal combustion engine includes an induction manifold and an exhaust manifold and said pressure exchanger comprises a first element and a second element mounted coaxially for relative rotation and means for effecting said relative rotation, said first element defining a ring of open-ended cells extending therethrough between two opposed faces thereof, said second element including low pressure inlet means to allow the introduction of low pressure fluid into said cells, high pressure outlet means to allow the extraction of high pressure fluid from said cells, said high pressure outlet means and said low pressure inlet means being circumferentially spaced from each other and both positioned adjacent one face of said first element, low pressure outlet means to allow the extraction of low pressure fluid from said cells and high pressure inlet means to allow the introduction of high pressure fluid into said cells, said low pressure outlet means and said high pressure inlet means being circumferentially spaced from each other and both positioned adjacent said other face of said first element, said low pressure inlet and outlet means together defining a low pressure scavenging zone and said high pressure inlet and outlet means together defining a high pressure scavenging zone, in which latter zone the scavenging of said cells is incomplete, the combination also including first duct means connecting said high pressure outlet means to said induction manifold and second duct means connecting said high pressure inlet means to said exhaust manifold, said low pressure inlet and outlet means being open to atmosphere.

4. The combination of a pressure exchanger and an internal combustion engine to be supercharged by said pressure exchanger, in which combination said internal combustion engine includes an induction manifold and an exhaust manifold and said pressure exchanger comprises a first element and a second element mounted coaxially for relative rotation and means for effecting said relative rotation, said first element defining a ring of open-ended cells extending therethrough between two opposed faces thereof, said second element including low pressure inlet means to allow the introduction of low pressure fluid into said cells, high pressure outlet means to allow the extraction of high pressure fluid from said cells, said high pressure outlet means and said low pressure inlet means being circumferentially spaced from each other and both positioned adjacent one face of said first element, low pressure outlet means to allow the extraction of low pressure fluid from said cells and high pressure inlet means to allow the introduction of high pressure fluid into said cells, said low pressure outlet means and said high pressure inlet means being circumferentially spaced from each other and both positioned adjacent said other face of said first element, said low pressure inlet and outlet means together defining a low pressure scavenging zone and said high pressure inlet and outlet means together defining a high pressure scavenging zone, the combination also including first duct means connecting said high pressure outlet means to said induction manifold and second duct means connecting said high pressure inlet means to said exhaust manifold, said low pressure inlet and outlet means being open to atmosphere.

5. The combination of a pressure exchanger and an internal combustion engine to be supercharged by said pressure exchanger; in which combination said internal combustion engine includes a first and second intake manifold and a first and second exhaust manifold; said pressure exchanger having multi cycle construction for each revolution comprising a first and second high pressure outlet port and a first and second high pressure inlet port; said first high pressure outlet being connected to said first intake manifold; said second high pressure outlet port being connected to said second intake manifold; said first high pressure inlet port being connected to said first exhaust manifold; said second high pressure inlet port being connected to said second exhaust manifold; said internal combustion engine having a plurality of cylinders comprising a first group of cylinders and a second group of cylinders; said first intake manifold and said first exhaust manifold being connected to said first group of cylinders; said second intake manifold and said second exhaust manifold being connected to said second group of cylinders.

6. The combination of a pressure exchanger and an internal combustion engine to be supercharged by said pressure exchanger; in which combination said internal combustion engine includes a first and second intake manifold and a first and second exhaust manifold; said pressure exchanger having multi cycle construction for each revolution comprising a first and second high pressure outlet port and a first and second high pressure inlet port; said first high pressure outlet port being connected to said first intake manifold; said second high pressure outlet port being connected to said second intake manifold; said first high pressure inlet port being connected to said first exhaust manifold; said second high pressure inlet port being connected to said second exhaust manifold; said internal combustion engine having a plurality of cylinders comprising a first group of cylinders and a second group of cylinders; said first intake manifold and said first exhaust manifold being connected to said first group of cylinders; said second intake manifold and said second exhaust manifold being connected to said second group of cylinders; said first and second group of cylinders being arranged to enable the blow down energy from any one cylinder to be supplied directly to said pressure exchanger to transform said blow down energy into compressed air to supercharge only one cylinder.

7. The combination of a pressure exchanger and an internal combustion engine to be supercharged by said pressure exchanger; in which combination said internal combustion engine includes a first and second intake manifold and a first and second exhaust manifold; said pressure exchanger having multi cycle construction for each revolution comprising a first and second high pressure outlet port and a first and second high pressure inlet port; said first high pressure outlet port being connected to said first intake manifold; said second high pressure outlet port being connected to said second intake manifold; said first high pressure inlet port being connected to said first exhaust manifold; said second high pressure inlet port being connected to said second exhaust manifold; said internal combustion engine having a plurality of cylinders comprising a first group of cylinders and a second group of cylinders; said first intake manifold and said first exhaust manifold being connected to said first group of cylinders; said second intake manifold and said second exhaust manifold being connected to said second group of cylinders; each of said cylinders following the sequence of being scavenged, a compression stroke and a work stroke; said first and second group of cylinders each being comprised of cylinders of which only one cylinder of the group is being scavenged at any one time; the blow-down energy of any one cylinder being supplied to said pressure exchanger to permit utilization of said blown-down energy to supercharge only one cylinder.

8. The combination of a pressure exchanger and an internal combustion engine to be supercharged by said pressure exchanger; in which combination said internal combustion engine includes a first and second intake manifold and a first and second exhaust manifold; said pressure exchanger having a first and second cycle for each revolution comprising a first and second high pressure outlet port and a first and second high pressure inlet port; said first high pressure outlet port being connected to said first intake manifold; said second high pressure outlet port being connected to said second intake manifold; said first high pressure inlet port being connected to said first exhaust manifold; said second high pressure inlet port being connected to said second exhaust manifold; said internal combustion engine having a plurality of cylinders comprising a first group of cylinders and a second group of cylinders; said first intake manifold and said first exhaust manifold being connected to said first group of cylinders; said second intake manifold and said second exhaust manifold being connected to said second group of cylinders; said first cycle comprising said first high pressure outlet port, said first high pressure inlet port, a first low pressure outlet port and a first low pressure inlet port; said second cycle comprising said second high pressure outlet port, said second high pressure inlet port, a second low pressure outlet port and a second low pressure inlet port.

9. The combination of a pressure exchanger and an internal combustion engine to be supercharged by said pressure exchanger; in which combination said internal combustion engine includes a first and second intake manifold and a first and second exhaust manifold; said pressure exchanger having a first and second cycle for each revolution comprising a first and second high pressure outlet port and a first and second high pressure inlet port; said first high pressure outlet port being connected to said first intake manifold; said second high pressure outlet port being connected to said second intake manifold; said first high pressure inlet port being connected to said first exhaust manifold; said second high pressure inlet port being connected to said second exhaust manifold; said internal combustion engine having a plurality of cylinders comprising a first group of cylinders and a second group of cylinders; said first intake manifold and said first exhaust manifold being connected to said first group of cylinders; said second intake manifold and said second exhaust manifold being connected to said second group of cylinders; said first cycle comprising said first high pressure outlet port, said first high pressure inlet port, a first low pressure outlet port and a first low pressure inlet port; said second cycle comprising said second high pressure outlet port, said second high pressure inlet port, a second low pressure outlet port and a second low pressure inlet port; said first and second group of cylinders being arranged to enable the blow-down energy from any one cylinder to be supplied directly to said pressure exchanger to transform said blow-down energy into compressed air to supercharge only the same cylinder from which said blow-down energy is received.

10. The combination of a pressure exchanger and an internal combustion engine to be supercharged by said pressure exchanger; in which combination said internal combustion engine includes a first and second intake manifold and a first and second exhaust manifold; said pressure exchanger having a first and second cycle for each revolution comprising a first and second high pressure outlet port and a first and second high pressure inlet port; said first high pressure outlet port being connected to said first intake manifold; said second high pressure outlet port being connected to said second intake manifold; said first high pressure inlet port being connected to said first exhaust manifold; said second high pressure inlet port being connected to said second exhaust manifold; said internal combustion engine having a plurality of cylinders comprising a first group of cylinders and a second group of cylinders; said first intake manifold and said first exhaust manifold being connected to said first group of cylinders; said second intake manifold and said second exhaust manifold being connected to said second group of cylinders; said first cycle comprising said first high pressure outlet port, said first high pressure inlet port, a first low pressure outlet port and a first low pressure inlet port; said second cycle comprising said second high pressure outlet port, said second high pressure inlet port, a second low pressure outlet port and a second low pressure inlet port; each of said cylinders following the sequence of being scavenged, a compression stroke and a work stroke; said first and second group of cylinders each being comprised of cylinders of which only one cylinder of the group is being scavenged at any one time; the blow-down energy of any one cylinder being supplied to said pressure exchanger to permit utilization of said blow-down energy to supercharge only the same cylinder from which said blow-down energy is received.

11. The combination of a pressure exchanger and an internal combustion engine to be supercharged by said pressure exchanger; in which combination said internal combustion engine includes a first and second intake manifold and a first and second exhaust manifold; said pressure exchanger having a first and second cycle for each revolution comprising a first and second high pressure outlet port and a first and second high pressure inlet port; said first high pressure outlet port being connected to said second intake manifold; said second high pressure outlet port being connected to said first intake manifold; said first high pressure inlet port being connected to said first exhaust manifold; said second high pressure inlet port being connected to said second exhaust manifold; said internal combustion engine having a plurality of cylinders comprising a first group of cylinders and a second group of cylinders; said first intake manifold and said first exhaust manifold being connected to said first group of cylinders; said second intake manifold and said second exhaust manifold being connected to said second group of cylinders; said first cycle comprising said first high pressure outlet port, said first high pressure inlet port, a first low pressure outlet port and a first low pressure inlet port; said second cycle comprising said second high pressure outlet port, said second high pressure inlet port, a second low pressure outlet port, and a second low pressure inlet port.

12. The combination of a pressure exchanger and an internal combustion engine to be supercharged by said pressure exchanger; in which combination said internal combustion engine includes a first and second intake manifold and a first and second exhaust manifold; said pressure exchanger having a first and second cycle for each revolution comprising a first and second high pressure outlet port and a first and second high pressure inlet port; said first high pressure outlet port being connected to said second intake manifold; said second high pressure outlet port being connected to said first intake manifold; said first high pressure inlet port being connected to said first exhaust manifold; said second high pressure inlet port being connected to said second exhaust manifold; said internal combustion engine having a plurality of cylinders comprising a first group of cylinders and a second group of cylinders; said first intake manifold and said first exhaust manifold being connected to said first group of cylinders; said second intake manifold and said second exhaust manifold being connected to said second group of cylinders; said first cycle comprising said first high pressure outlet port, said first high pressure inlet port, a first low pressure outlet port and a first low pressure inlet port; said second cycle comprising said second high pressure outlet port, said second high pressure inlet port, a second low pressure outlet port, and a second low pressure inlet port; said first and second group of cylinders being arranged to enable the blow-down energy from any one cylinder of either group to be supplied directly to said pressure exchanger to transform said blow-down energy into compressed air to supercharge only one cylinder from the other group.

13. The combination of a pressure exchanger and an internal combustion engine to be supercharged by said pressure exchanger; in which combination said internal combustion engine includes a first and second intake manifold and a first and second exhaust manifold; said pressure exchanger having a first and second cycle for each revolution comprising a first and second high pressure outlet port and a first and second high pressure inlet port; said first high pressure outlet port being connected to said second intake manifold; said second high pressure outlet port being connected to said first intake manifold; said first high pressure inlet port being connected to said first exhaust manifold; said second high pressure inlet port being connected to said second exhaust manifold; said internal combustion engine having a plurality of cylinders comprising a first group of cylinders and a second group of cylinders; said first intake manifold and said first exhaust manifold being connected to said first group of cylinders; said second intake manifold and said second exhaust manifold being connected to said second group of cylinders; said first cycle comprising said first high pressure outlet port, said first high pressure inlet port, a first low pressure outlet port and a first low pressure inlet port; said second cycle comprising said second high pressure outlet port, said second high pressure inlet port, a second low pressure outlet port, and a second low pressure inlet port; each of said cylinders following the sequence of being scavenged, a compression stroke and a work stroke; said first and second group of cylinders each being comprised of cylinders of which only one cylinder of the group is being scavenged at any one time; the blow-down energy of any one cylinder being supplied to said pressure exchanger to permit utilization of said blow-down energy to supercharge only one cylinder from the other group.

14. The combination of a pressure exchanger and an internal combustion engine to be supercharged by said pressure exchanger, in which combination said internal combustion engine includes an intake manifold and an exhaust manifold and said pressure exchanger comprises a rotor and a first and second stator, a rotor mounted coaxially for relative rotation with respect to said first and second stator; said rotor having channels extending therethrough between two opposed faces thereof, said first stator including low pressure inlet means to allow the introduction of low pressure fluid into said cells and high pressure outlet means to allow the extraction of high pressure fluid from said cells, said high pressure outlet means and said low pressure inlet means being circumferentially spaced from each other and both positioned adjacent one face of said rotor, said second stator including low pressure outlet means to allow the extraction of low pressure fluid from said cells and high pressure inlet means to allow the introductions of high pressure fluid into said cells, said low pressure outlet means and said high pressure inlet means being circumferentially spaced from each other and both positioned adjacent said other face of said rotor, said low pressure inlet and outlet means together defining a low pressure scavenging zone and said high pressure inlet and outlet means together defining a high pressure scavenging zone, the combination also including first duct means connecting said high pressure outlet means to said intake manifold and a second duct means connecting said high pressure inlet means to said exhaust manifold; said low pressure inlet and outlet means being open to atmosphere.

References Cited in the file of this patent

UNITED STATES PATENTS

| | | |
|---|---|---|
| 2,200,744 | Heinzelmann | May 14, 1940 |
| 2,399,394 | Seippel | Apr. 30, 1946 |
| 2,674,086 | Nichols | Apr. 6, 1954 |
| 2,738,123 | Hussmann | Mar. 13, 1956 |